(12) United States Patent
Kauppinen

(10) Patent No.: US 7,085,365 B2
(45) Date of Patent: Aug. 1, 2006

(54) GROUP INFORMATION MANAGEMENT

(75) Inventor: Risto Kauppinen, Helsinki (FI)

(73) Assignee: Nokia Corporation, Espoo (FI)

( * ) Notice: Subject to any disclaimer, the term of this patent is extended or adjusted under 35 U.S.C. 154(b) by 36 days.

(21) Appl. No.: 10/889,297

(22) Filed: Jul. 13, 2004

(65) Prior Publication Data
US 2005/0232406 A1    Oct. 20, 2005

(30) Foreign Application Priority Data
Apr. 16, 2004   (FI) ................................. 20045138

(51) Int. Cl.
*H04M 3/42* (2006.01)
(52) U.S. Cl. .............................. 379/202.01; 379/203.01
(58) Field of Classification Search ........... 379/202.01, 379/220.01, 221.08, 221.09, 221.13, 225, 379/203.01
See application file for complete search history.

(56) References Cited

U.S. PATENT DOCUMENTS

| | | | | |
|---|---|---|---|---|
| 5,668,860 A | * | 9/1997 | Andruska et al. | 379/211.02 |
| 6,249,577 B1 | * | 6/2001 | Baldwin | 379/221.09 |
| 6,438,223 B1 | * | 8/2002 | Eskafi et al. | 379/221.13 |
| 2002/0150091 A1 | | 10/2002 | Lopponen et al. | |
| 2003/0187926 A1 | | 10/2003 | Karjanlahti | |

* cited by examiner

*Primary Examiner*—Bing Q. Bui
(74) *Attorney, Agent, or Firm*—Squire, Sanders & Dempsey L.L.P.

(57) ABSTRACT

A communication system including a first administrative subsystem and a second administrative subsystem providing group communication service. The system includes a first server for storing group and list management information of subscribers of the first administrative subsystem. The system also includes a second server for storing group and list management information of subscribers of the second administrative subsystem. Further, the system includes an interface for exchanging group and list management information between the first server and the second server. In addition, the system reduces ambiguity in group information management of integrated systems that include two or more administrative domains.

18 Claims, 3 Drawing Sheets

GROUP INFORMATION MANAGEMENT

FIELD OF THE INVENTION

The present invention relates to telecommunications, and more particularly to management of group communication information in telecommunication systems.

BACKGROUND OF THE INVENTION

In public mobile communications systems, multi-user communication has traditionally been provided with a conference call service. A conference call is based on simultaneous individual telephone calls that are interconnected through a bridging facility, and allows users from several diverse locations to be connected for shared communication. Collecting a conference call by setting up the number of calls is a time-consuming task, and thus multi-user calls have not been widely used in public telecommunication. With the increasing and continually diverging usage of telecommunication, also the interest in instant group communication has recently risen remarkably.

A group is defined by a set of rules that identifies a collection of members. Group communication, as used herein, thus refers to a multipoint communication relationship that exists between the members of a group for the purpose of transferring data. Groups are created logically, which means that special group communication information maintained in the system associates a specific user with a particular group. One user may be a member in one or more groups, and the association can typically be dynamically created, modified and/or cancelled. Very often the members in a group belong to a specific organization, such as to a private company, a logistic fleet etc. One organization may have several individual groups, for example sets of groups, categorized according to their functional tasks. Also private persons may be associated to talk groups, such as hobby groups, sport groups, etc.

Conventionally, group communication has been available in trunked mobile communications systems, such as Professional Mobile Radio (PMR) systems. PMR systems are special radio systems primarily intended for professional and governmental users. In PMR systems, the group communication service functionality has mainly been inherently integrated into the switching and connection set-up or call control functionalities of the communications system. In a more recent approach, a public mobile communication system has been configured to provide the group communication service functionality as a packet-based user or application level service. In the solution, the underlying communications system provides the basic connections (e.g. IP connections) between the group communications applications in devices and the group communication service. An example of such solutions is Push-to-talk over Cellular (PoC), an overlay speech service provided by a communication server system.

In PoC, IP layer audio distribution uses standard VoIP mechanisms and/or Real-time Transport Protocol (RTP). Specific Internet protocols or interfaces are used to connect supplementary network entities, and client applications reside in user equipment or terminals. For management and information query/updating purposes, a PoC system also comprises a Subscriber and Group Management Function (SGMF). Via SGMF the operator or a normal user that possesses adequate management rights can create, delete and modify users and groups in the PoC system.

Due to the great interest in PoC services, individual vendors have already provided early adoptions of the technology, primarily in the form of standalone PoC systems. Quite recently a group of organizations prepared an industry specification for PoC, with the aims of following existing $3^{rd}$ Generation Partnership Project (3GPP) IP Multimedia Subsystem (IMS) specifications. Since then the standardization work in this direction has continued in Open Mobile Alliance (OMA) using the existing set of specifications as a starting point.

In the existing systems, user and group management operations are performed by management users that have access to SGMF. Group creation is performed based on identities of existing users whose basic data has already been inputted to the system. SGMF provides access to the management user, who inputs data on the group to be created, and the group name is updated in the PoC main information repository. SGMF maintains information on authorized management users and their rights. In the recent PoC specifications, the subscriber and group management functions are implemented in a Group and List Management Server (GLMS). In GLMS, a user creating a group or a list into the GLMS will automatically become its owner, and GLMS allows the owner to manipulate the group or the list.

Emerging from standalone PoC systems to integrated systems, however, has introduced some difficulties for the management of the group information. An integrated system with two or more separately operated PoC systems would allow a user to make definitions regarding subscribers of another PoC system, but operations on groups and lists may fail for many reasons. For example, a user inputs definitions to include subscribers of another PoC system into a new group, but the creation of the group may fail because, for example, the identifier of the subscriber of another PoC system may be invalid, or non-existing, or the target subscriber of another PoC system may have specified that he or she does not want to be included in group creation of the particular user. Upon managing group and list information, the user operates merely based on the identity information of the subscribers, which does not directly indicate the validity of the user, nor the possible policy definitions submitted by the users. On the other hand, the existing home servers only manage information on their own users. This leads to unpredictability in group communication and the related operations. Such indefinite success or failure in operations is an annoying disadvantage that may deter many users from adopting the new communication service.

BRIEF DESCRIPTION OF THE INVENTION

An object of the present invention is thus to provide a solution for eliminating or alleviating the above problems in management of group communication information. The objects of the invention are achieved by a method, a system, a server, and a computer program product which are characterized by what is stated in the independent claims. Preferred embodiments of the invention are disclosed in the dependent claims.

The invention is based on the idea of introducing a mechanism that allows relevant information of group communication to be appropriately exchanged between administrative domains that offer group communication services.

An advantage of the method, system and server of the invention is that ambiguity in group information management of integrated systems that comprise two or more administrative domains is remarkably reduced. As a result, users who make definitions related to group communication information need to be less concerned about the administrative domains of the operators, which increases the user-friendliness of the system and thus contributes to easy adoption of the group communication services.

BRIEF DESCRIPTION OF THE DRAWINGS

In the following, the invention will be described in greater detail by means of preferred embodiments and with reference to the attached drawings, in which.

DETAILED DESCRIPTION OF THE INVENTION

The present invention is applicable to any digital communication system that provides group communication service. Group communication, as used herein, refers to a multipoint communication relationship between members in a group for the purpose of transferring data. Members in the group are defined with special group communication information that associates a specific user with the particular group. As an example of a system environment where the present invention may be applied, a mobile communication system with a Push-to-talk over Cellular (PoC) server system is described with reference to FIG. 1. For a person skilled in the art it is clear that the invention is also applicable to other types of telecommunication systems capable of fulfilling the above requirement, for example to fixed telecommunication systems.

Figure 1:
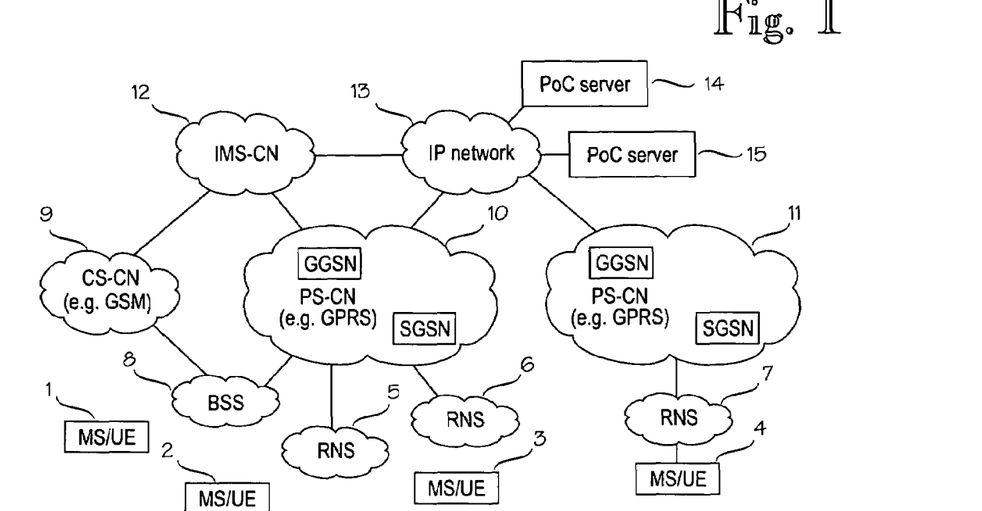
FIG. 1 illustrates a prior art communication system with a PoC overlay speech service.

As illustrated in FIG. 1, in the third generation (3G) mobile communications systems, a public land mobile network (PLMN) infrastructure may be logically divided into a core network (CN) 9, 10, 11, 12 and an access network (AN) infrastructures 5, 6, 7, 8. The access network AN may refer to, for example, a base station subsystem (BSS) 8 for a GSM and radio network subsystem (RNS) or a radio access network (RAN) 5, 6, 7 for UMTS. In the technical specifications of a third generation partnership project (3GPP), the core network CN is logically divided into a circuit switched (CS) domain 9, a packet switched (PS) domain 10,11 and an IP multimedia subsystem (IMS) 12. The CS domain refers to a set of core network entities offering a circuit switched type of connection for user traffic as well as all the entities supporting the related signalling. A circuit switched type of connection is a connection for which dedicated network resources are allocated upon connection establishment and released upon connection release. A packet switched type of connection, on the other hand, transports user information using packets so that each packet can be routed independently from a previous one. Examples of the PS domain may include the GPRS (General Packet Radio Service), and typical entities may include a serving GPRS support node (SGSN) and a gateway GPRS support node (GGSN). The IP multimedia subsystem comprises CN elements for provision of multimedia services. The IP multimedia subsystem IMS utilizes the PS domain to transport multimedia signalling and bearer traffic.

Push-to-talk over Cellular (PoC) is an overlay speech service in a mobile cellular network where a connection between two or more parties is typically established for a long period but the actual radio channels in the air interface are activated only when someone is talking. This corresponds to the usage of traditional radiotelephones where the radio frequency used is agreed between the parties (e.g. military/police radios, LA radios) or permanently set (walkie-talkie type of radios) and whenever someone wants to talk, she/he presses the tangent, which activates the radio transmission on the selected channel. The traditional radiotelephone services are simplex by their nature so that only one party (the one who is pressing the tangent) can talk at a time.

More specifically, in voice communication with a "push to talk, release to listen" feature, a call is based on the use of a pressel (ptt, push to talk switch) in a telephone as a switch: by pressing a pressel the user indicates his/her desire to speak, and the user equipment sends a service request to the network. Alternatively, a voice activity detector (VAD) or any suitable means can be used instead of the manual switch. The network either rejects the request or allocates the requested resources on the basis of predetermined criteria, such as the availability of resources, priority of the requesting user, etc. At the same time, a connection is also established to a receiving user, or users in the case of group communication. After the voice connection has been established, the requesting user can talk and the other users can listen. When the user releases the pressel, or in the case of traffic inactivity, the event is detected in the network. The resources may be released and/or a talk item may be granted to another user.

In FIG. 1, a Push-to-talk over Cellular (PoC) server system is provided on top of the packet switched (PS) core network 10, 11, 12 in order to provide a packet mode (e.g. IP) group communication services to a user of the User Equipment (UE) 1, 2, 3, 4. UE accessing the PS CN, and the PS core network itself, utilizes the services provided by the radio network subsystem (RNS) or radio access network (RAN) 5, 6, 7, 8 to provide packet-mode communication between the UE and a PS CN subsystem. The multiple access method employed in the air interface in the RAN may be Time Division Multiple Access (TDMA), Frequency Division Multiple Access (FDMA), Code Division Multiple Access (CDMA), or a combination thereof. In the $3^{rd}$ and higher generation mobile communications system the access method is primarily based on the CDMA. Further, because the traffic channels may have a wide bandwidth, corresponding to user data rates e.g. up to 2 Mbits/s, such access may also be referred to as a Wideband CDMA (WCDMA).

Conceptually, a packet based media communication system is provided on top of the mobile network in order to provide media communication services to user equipment through the communication system. The media communication system may be embodied as a server system, and it is generally referred to as a media communication server herein. A media communication system may comprise a plurality of media communication servers 14, 15.

A media communication server 14, 15 may comprise control-plane functions and user-plane functions that provide packet mode server applications communicating with the communication client application(s) in the user equipment over the IP connections provided by the communication system. This communication includes signalling packets and voice or data communication packets. Since both group and user specific requirements are needed, there may be two kinds of control-plane functions. Session Initiation Protocol (SIP) sessions for group communications are handled by a Group Control Plane Function (G-CPF). When a user connects to a group, the G-CPF takes care of the related SIP invitation transaction and performs the proper mapping settings between the user's recipient and the network entities responsible for the related traffic distribution. A User-Control Plane Function (U-CPF) is basically the control plane interface between the IP network and the user. By this network entity, the users log on to the system and negotiate their operational settings (scanning settings, selected group etc.). U-CPF handles the user's profile and manages his or her one-to-one calls. It should be appreciated that this is just a logical separation, and both kinds of Control Plane Functions can be situated in the same computer. However, this logical separation of G-CPF and U-CPF enables users to join groups handled by G-CPF in different intranets or in mobile networks of different operators and IP domain. The division also brings scalability by allowing, in practice, an infinite number of groups or users in the system.

Figure 2:
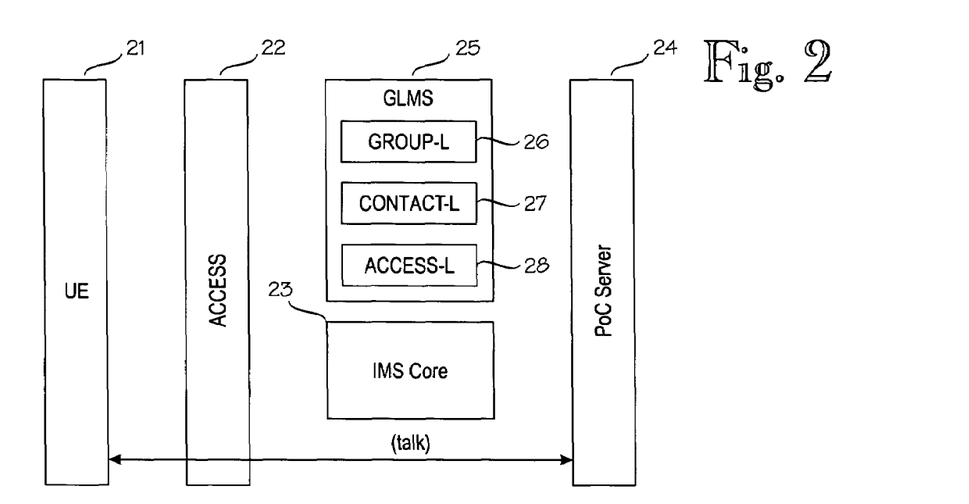
FIG. 2 is a block diagram illustrating a prior art PoC functional architecture in one domain.

In a functional PoC architecture, as shown in FIG. 2, the subscriber and group management function is implemented in a Group and List Management Server (GLMS). In FIG. 2, User Equipment (UE) 21 represents a user terminal that comprises PoC application client software. Access 22 in the PoC architecture represents the radio access as well as other necessary nodes to achieve IP connectivity, as described above. An IMS Core 23 represents a number of Session Initiation Protocol (SIP) proxies and SIP registrars necessary for implementing IP multimedia services. Detailed technical specifications for an IP Multimedia Subsystem are publicly available in the 3GPP specifications, and correspondingly, specifications of Session Initiation Protocol are available in the IETF specifications, and therefore considered well known to a person skilled in the art.

In the functional PoC architecture, a PoC Server 24 represents a media communication server that is the endpoint of SIP, Real-time Transport protocol (RTP) and Realtime Transport Control Protocol (RTCP) signaling, provides SIP session handling, policy control for access to groups, group session handling, access control, do-not-disturb functionality, floor control functionality, talker identification, participants information, quality feedback, charging reports and media distribution.

Herein group information relates to a defined information element that associates a specific user with one or more groups. Group information in PoC is structured into groups, contact lists and access lists. The operation of a Group and List Management Server (GLMS) 25 in PoC thus comprises management of groups 26, contact lists 27 and access lists 28 stored in the GLMS. Contact lists 27 are used for storing contact entries in the GLMS server, and act as address books for the PoC users in establishing an instant talk session with other PoC users or PoC groups. A PoC user may have one or more contact lists, and each contact list is uniquely identified by its SIP URI. The PoC user stores user contacts in lists of the type "user" and group contacts to lists of the type "group". Entries within one list are of the same type. GLMS allows manipulation of contact lists, and manipulation of identities in a contact list. A user who creates a contact list will automatically become its owner, and basically only the owner is allowed to manipulate the list. The owner of the list may reliably create, store, modify, retrieve, and delete contact lists, as well as add and remove end user and group identities to/from the list and add and remove contact lists themselves. By specification, when the user stores or adds a new identity into the contact list, the GLMS validates that the given address [SIP Uniform Resource Identifier (SIP URI) or Telephone Uniform Resource Locator (TEL URL)] is syntactically valid, but does not validate that the identity represents an existing entity.

Access lists 28 are used to define who is or is not allowed allowed to reach the PoC user via PoC service. When the PoC Server 24 is requested to add a participant to a talk session, the access lists are matched against the identity of the initiator of the talk session request. An access list comprises definitions on who is or is not allowed to reach a specific user via the PoC service. A PoC user may have a list of blocked identities, also called a user reject list, and a list of granted identities, also called a user accept list. The access lists are activated or deactivated by setting an attribute "in use". The GLMS allows the PoC user to manipulate identities and attributes of his/her own user accept lists and user reject lists.

Group lists 26 are used to define PoC specific groups. PoC users may store and retrieve groups located in the GLMS server as well as create and delete groups and change their attributes, including manipulation of lists that are part of a group definition. In creating the group, the GLMS validates that the given SIP URI or TEL URL is syntactically correct. A PoC user may have none or several groups defined. The attributes of the groups include, for example:

Display name. Display names are represented as an UTF8-encoded UNICODE string.

Group identity. A group identity is uniquely identified by a SIP URI, generated by the GLMS when the user creates the group.

Timestamp. The timestamp is used in order to make caching of lists possible on UE.

Talk session type. Defines whether a talk session is of the type "chat" or "instant" talk. For instant talk all the group members are invited to the talk session on the end user's request, while chat implies that each group member joins the talk session individually.

Membership. Shall be set either as "open" or "restricted". For open, any end user may join the group, while restricted implies that only particular end users on the member list may participate in the group talk session. The group reject list shall be used to restrict access to open groups.

Group reject list. A list of user identities.

Group member list. A list of user identities.

Maximum number of participants. A number used to limit the size of the group.

For a person skilled in the art it is clear that the definitions in this context relate to the specific PoC embodiment of the present invention, and the invention should not be interpreted to be limited to the terms and definitions used herein. Group information that associates specific user with one or more groups may be structured arbitrarily according to the service utilizing group communication.

Figure 3:
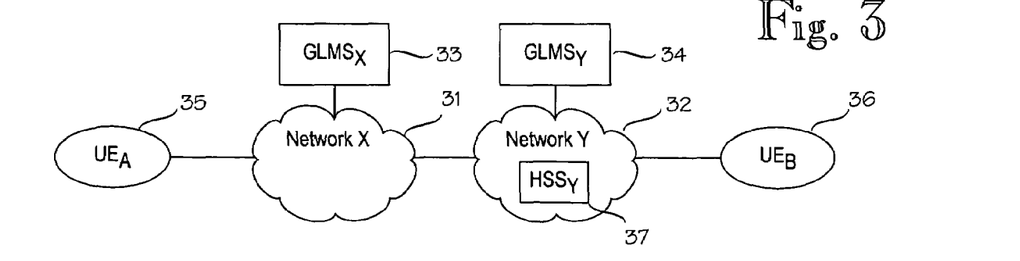
FIG. 3 is a block diagram illustrating elements in an embodiment of the present invention.

In the following, an embodiment of the present invention is illustrated by means of FIG. 3 and FIG. 4. FIG. 3 shows two interconnected PoC domains, network X 31 and network Y 32. Network X 31 and network Y 32 are communication networks that provide radio access as well as necessary nodes to gain IP connectivity. Furthermore, networks X and Y comprise an IMS Core Network subsystem for provision of multimedia services, as described in connection with FIGS. 1 and 2. It should be noted that for the sake of clarity, only elements essential for illustrating this particular embodiment of the present invention are shown. For a person skilled in the art it is clear that complete communication networks comprise a plurality of elements that are not explicitly shown herein.

FIG. 3 also shows two units of user equipment $UE_A$ 35, $UE_B$ 36, where the home network of $UE_A$ is network X and the home network of $UE_B$ is network Y. User equipment may be a wireless device, such as mobile user equipment, or it may be a device connected by a fixed connection, such as a dispatcher station. Herein the term "user equipment" and the corresponding acronym "UE" are used to refer to any device or user equipment allowing the user to access network services.

In this exemplary embodiment, user equipment, such as a Mobile Station MS, has a PoC application on a user layer on top of the standard protocol stack used in the specific mobile communications system. An appropriate session control protocol, such as a Session Initiation Protocol (SIP), may be used for the PoC control plane signaling. Voice communication may be based on IP communication (such as voice over IP, VoIP), and RTP (Real-time Transport Protocol, defined in RFC1889) may be employed to handle voice packet (VoIP) delivery on the user plane. The SIP and RTP protocols employ the underlying Transmission Control Protocol (TCP), User Datagram Protocol (UDP) and IP protocols that further employ the physical layer resources, such as the radio resources. For example, an underlying connection in a mobile communication network may be based on a GPRS connection.

Further to manage groups, contact lists and access lists of PoC users of network X, network X comprises a Group and List Management Server $GLMS_x$ 33, and a Group and List Management Server $GLMS_y$ 34 correspondingly manages lists of PoC users of network Y. In network Y there is also illustrated a Home Subscriber Server $HSS_y$, a register where subscriber parameters of subscribers of network Y are permanently stored. The HSS provides the functions of the traditional home location register, but communicates also via IP-based interfaces.

Figure 4:
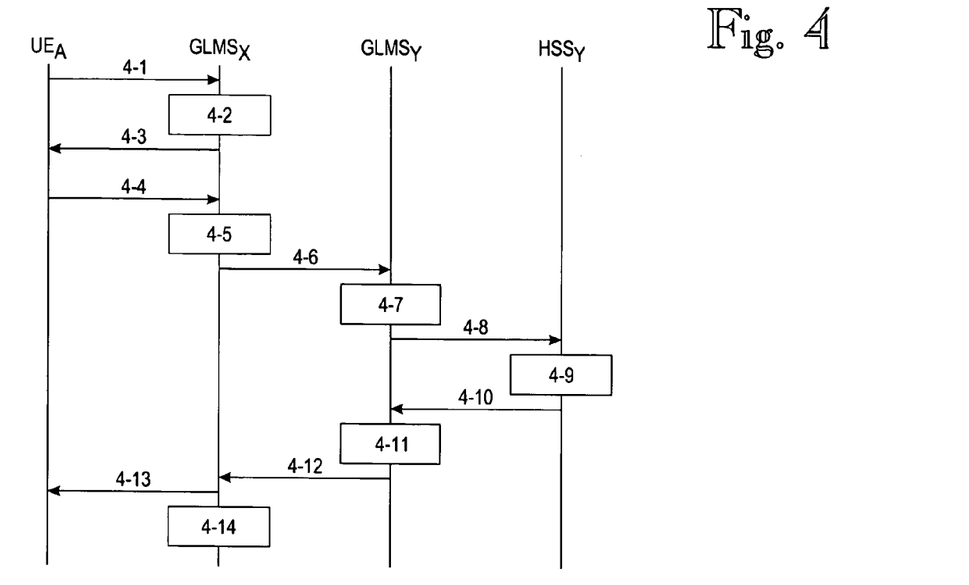
FIG. 4 is a signalling chart illustrating an embodiment of the present invention.

The signaling chart of FIG. 4 illustrates communication between the elements of FIG. 3 in the embodied method of the present invention. As an example of a group management action, creation of a group and inclusion of a new member is elaborated without limiting the scope to the group creation. It is clear that the invention may be applied to any group management action of the communication system. Communication between user $UE_A$ 35 and the Group and List Management Server $GLMS_x$ 33 of network X is implemented over a commonly specified interface Im. It should be noted that for the sake of clarity, only messages essential for illustrating this particular embodiment of the present invention are shown in FIG. 4. For a person skilled in the art it is clear that communication in complex networks may comprise a lot of signaling that is not related to the present invention and therefore not explicitly shown in FIG. 4.

As an example, a case is studied where user $UE_A$ of network X creates a new group GroupA and wishes to include the PoC user $UE_B$ 36 of network Y in the group. In step 4-1, user $UE_A$ sends to the Group and List Management Server $GLMS_x$ an HTTP/XML request with the parameter 'Action' set as create_group and provides relevant group attributes, like the display name (GroupA), SIP URI of the owner, session type etc., as described above. In response to the received message, $GLMS_x$ creates a new group for user $UE_A$, generates a unique SIP URI for the group, sets the group attributes to the requested value (step 4-2). When this is completed, $GLMS_x$ sends (step 4-3) in an HTTP "200 OK" final response to the user $UE_A$ a document that describes the created group, including the SIP URI of the GroupA.

The new created group has the defined attributes and an empty group member list and an empty group reject list. In step 4-4 user $UE_A$ sends $GLMS_x$ an HTTP/XML request with the parameter 'Action' set as add_member_list_entry, directs the action to GroupA by including the SIP URI of the GroupA, and provides the URI, and optionally the display name of user $UE_B$ that user $UE_A$ wants to be added to GroupA. Upon receiving the message 4-4, $GLMS_x$ detects (step 4-5) that user $UE_B$ belongs to another PoC domain (network Y), and generates to the Group and List Management Server $GLMS_y$ of network Y an inquiry for finding out relevant group information of user $UE_B$. Such relevant information may comprise any information that is necessary for completing the current group management action of user $UE_A$, for example, the information whether user $UE_B$ is an existing subscriber of network Y, or whether user $UE_B$ has group management policy definitions that may affect the success or failure of the group management action. The new functionality for this purpose may be defined as a new interface that supports communication between Group and List Management Servers of different networks. In the case of FIG. 3, where networks X and Y are separate networks the interface may be implemented as network-to-network interface (NNI). A network-to-network interface relates to a boundary between two administrative domains that are operated and supervised separately. The protocol to be used in the GLMS—GLMS interface is not, as such, relevant to the invention, but in this context for example an XCAP based protocol used between the UE and the GLMS, or some corresponding protocol, is applicable to the NNI. In the current embodiment, when using a corresponding group management protocol between the GLMSs and between the user equipment and the GLMS, the originating GLMS would function as a client, and the terminating GLMS would function as a server. $GLMS_x$ includes in the inquiry the identity of user $UE_B$ and sends (step 4-6) the request to $GLMS_y$. In response to the received message, $GLMS_y$ initiates (step 4-7) a consistency check on user $UE_B$.

For the consistency check, the Group and List Management Server $GLMS_y$ may simply comprise an internal database that comprises a register of valid and existing PoC users in network Y. On the other hand, according to the IMS specification $GLMS_y$ may communicate with the home subscriber server HSSy 37 of its own network using the Sh interface of IMS. The Sh interface is an intra-operator interface that transports transparent data, for example service related data, user related information, etc. The Sh interface also supports mechanisms for transferring user related data stored in the $HSS_y$ 37.

In the embodiment of FIG. 4, the latter option is employed. In step 4-8, $GLMS_y$ sends $HSS_y$ an inquiry comprising the identity of user $UE_B$. In response to the inquiry, $HSS_y$ checks (step 4-9) that user $UE_B$ is a valid user of network Y and responds to $GLMS_y$ with an ok/nok acknowledgement (step 4-10). $GLMS_y$ further checks the group, contact list and access list information of user $UE_B$ to find out whether user $UE_B$ has made definitions, or if there exists some policy rule that would affect the accessibility of user $UE_B$ to user $UE_A$. If the acknowledgement from the $HSS_y$ is positive and group information definitions of user $UE_B$ allow access of user $UE_B$ to user $UE_A$, $GLMS_y$ confirms in a response to $GLMS_x$ (step 4-12) a successful consistency check. in another case, $GLMS_y$ informs $GLMS_x$ that the action has failed, and optionally provides the reason for the failure. Depending on the result, $GLMS_x$ acknowledges the group member list entry positively or negatively. Steps 4-4 to 4-13 may be repeated for all the users that user $UE_A$ wishes to include in GroupA. In step 4-14, $GLMS_x$ performs the group management action according to the information available in $GLMS_x$ and received from $GLMS_y$.

With the arrangement described above, user $UE_A$ is able to know the actual contents of the new group and is aware of the members that have not been successfully included in the group member list. When a negative acknowledgement occurs, user $UE_A$ may choose to initiate actions for finding out the valid information from the targeted user.

Figure 5:
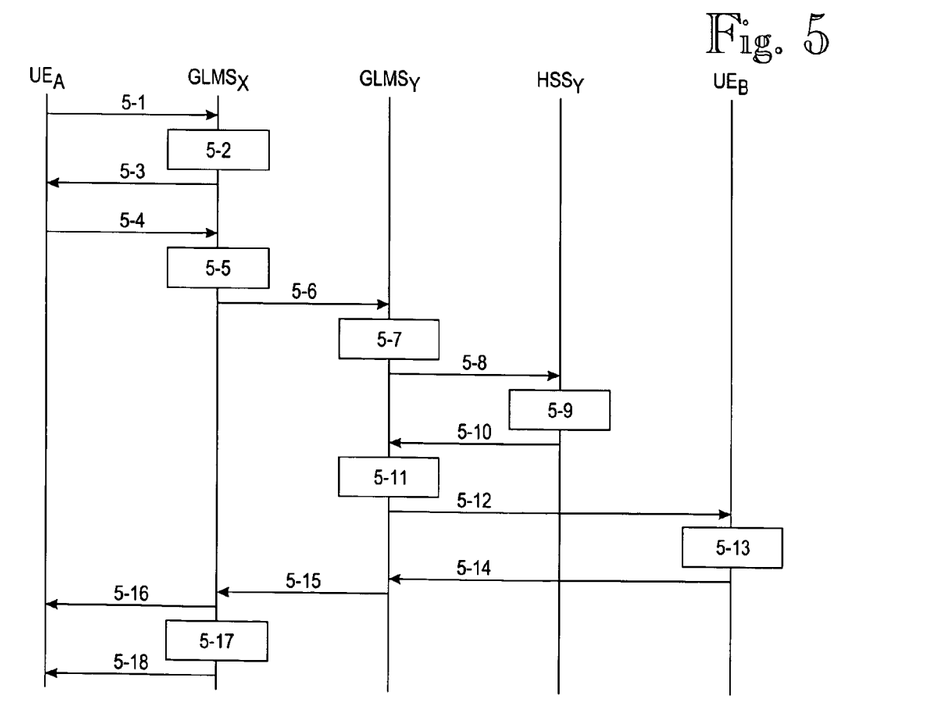
FIG. 5 is a signalling chart illustrating another embodiment of the present invention.

Upon interconnecting several standalone PoC systems it may be assumed that initially the policy information in home GLMS does not necessarily comprise definitions to cover users of other networks. FIG. 5 illustrates a further embodiment of the present invention, where this problem is alleviated. In this embodiment, steps 5-1 to 5-10 correspond directly to steps 4-1 to 4-10. In step 5-11, $GLMS_y$ checks the group, contact list and access list information of user $UE_B$ to find out whether user $UE_B$ has made definitions that would affect the accessibility of user $UE_B$ to user $UE_A$. Upon noticing that no such definitions are available and that the policy check concerns user $UE_A$ of another network, $GLMS_y$ may send (step 5-12) to user $UE_B$ a request that comprises the identity of user $UE_A$ to confirm whether user $UE_B$ allows him/herself to be included in a group owned by user $UE_A$. User equipment $UE_B$ displays the inquiry and receives the answer inputted by the user (step 5-13) and delivers the positive or negative acknowledgement to $GLMS_y$ (step 5-14). $GLMS_y$ informs $GLMS_x$ about a successful action (step 5-15) or informs that the action has failed, and optionally provides the reason for the failure. Depending on the result, $GLMS_x$ correspondingly acknowledges the group member list entry positively or negatively (step 5-16). In step 5-17, $GLMS_x$ performs the group management action according to the information available in $GLMS_x$ and received from $GLMS_y$. In step 5-18, $GLMS_x$ acknowledges the group member list entry positively or negatively to $UE_A$.

With the above arrangement user $UE_A$ may know the actual content of the new group and be aware of the members that have not been successfully included in the group member list, even in cases where some members are subscribers of other networks and have not previously been commonly involved in PoC operations with user $UE_A$. This works in favor of smooth integration of standalone PoC networks and thus contributes to easy adoption of the enhanced services.

In the above embodiment, the invented functionality has been described in operations between two separate networks. The subscriber status is, however, a dynamically changing factor, and in another embodiment of the present invention the GLMS may be arranged to implement the validity check for each user involved in the requested group management operation. In such a case, when the target user is a subscriber of its own network, $GLMS_x$ performs the steps previously described for $GLMS_y$, and when the target user is a subscriber of another network, the procedure is as described in connection with FIGS. 4 and 5.

The implementation of the described mechanisms in the user equipment is illustrated with reference to FIG. 6 that comprises a functional description of user equipment. The user equipment may be a wireless device, such as mobile user equipment, or it may be a device connected by a fixed connection, such as a dispatcher station. In the description the term "user equipment" and the corresponding acronym "UE" are used to refer to any device or user equipment allowing the user to access network services.

Figure 6:
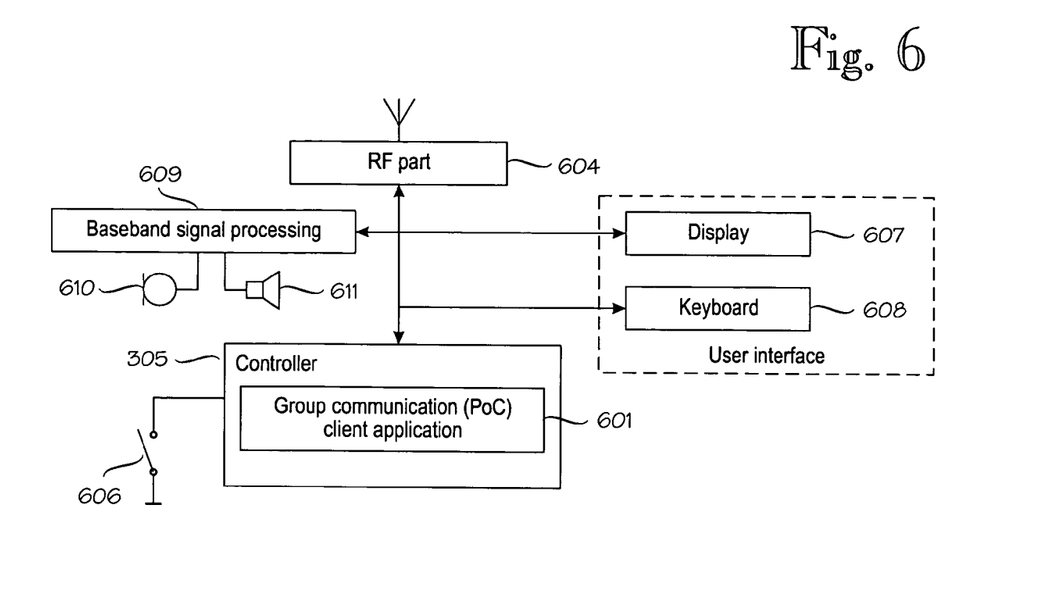
FIG. 6 is a block diagram illustrating functional elements of an embodied user equipment with PoC.

An example of a possible implementation of user equipment is illustrated in a simplified block diagram shown in FIG. 6. An RF part 604 represents any radio frequency function and hardware required by a specific air interface employed. The actual implementation of the RF part 604 is not relevant to the present invention. Baseband signal processing 609 represents any baseband signal processing required in any specific implementation, such as an analog-digital (A/D) conversion of the analogue speech signal from the microphone 610, vo-encoding, IP packet building, frame building, deframing, IP packet debuilding, vo-decoding, a digital-analog (D/A) conversion of the received digital speech signal into an analog signal applied to a loudspeaker 611. A controller 605 controls the operation of the RF unit 604 and the baseband signal-processing unit 609. The controller 605 controls the signaling, both outband (SIP) and embedded, as well as IP packet building and debuilding. Start and stop of the speech items are set by the pressel switch 606 that can be replaced by any user-operated device, e.g. a voice activity detector (VAD). Such alternative mechanisms for starting and ending a speech item instead of the pressel are obvious to a person skilled in the art. A user interface may include a display 607 and a keyboard 608. It should be appreciated that the blocks illustrated in FIG. 6 are functional blocks that can be implemented in a variety of different circuit configurations. For example, the baseband processing and the controller may be implemented in a single programmable unit (e.g. a CPU or a signal processor) or in a plurality of units. The operation in the embodiments of the present invention is primarily related to the controller part of the MS, and the basic invention may be implemented as program modifications in the control program of the MS, for example. It should also be appreciated that the present invention is not intended to be restricted to mobile stations and mobile systems but the terminal can be any terminal having a real-time communication capability. For example, the user terminal may be a terminal (such as a personal computer PC) having Internet access and a VoIP capability for voice communication over the Internet.

In the embodiment of FIG. 6, the controller 605 comprises a media communication client application 601 (e.g. PoC client). The media communication client application 601 (e.g. PoC client) provides the respective communication service. For example, in the case of the PoC group communication, the client application 601 may maintain group information, such as group identification information and group membership information. The communication client 601 may also provide the management tools for group creation, for attaching to (joining) a group and for detaching from (leaving) the group, starting and ending speech items, etc.

Figure 7:
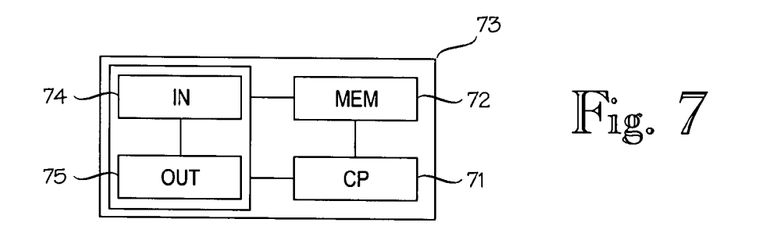
FIG. 7 is a block diagram illustrating functional elements of an embodied PoC Group and List Management Server.

Correspondingly, the implementation of the described mechanisms in the Group and List Management Server is illustrated with reference to FIG. 7. By definition, a server is a computer that serves other computers in the same network by operating as the other computers request. FIG. 7 provides a functional description of a Group and List Management Server that is used in PoC to manage groups, contact lists and access lists. The Group and List Management Server comprises processing means 71, an element that comprises an arithmetic logic unit, a number of special registers and control circuits. Connected to the processing means are memory means 72, a data medium where computer-readable data or programs or user data can be stored. The memory means typically comprise memory units that allow both reading and writing (RAM), and a memory whose contents can only be read (ROM). The unit also comprises an interface block 73 with input means 74 for inputting data for internal processing in the unit, and output means 75 for outputting data from the internal processes of the unit. Examples of said input means comprise a plug-in unit acting as a gateway for information delivered to its external connection points. For receiving information on the operator, the Group and List Management Server may also comprise a keypad, or a touch screen, a microphone, or the like. Examples of said output means include a plug-in unit feeding information to the lines connected to its external connection points. For outputting information to the operator of the Group and List Management Server, they may also comprise a screen, a touch screen, a loudspeaker, or the like. The processing means 71, memory means 72, and interface block 73 are electrically interconnected for performing systematic execution of operations on the received and/or stored data according to the predefined, essentially programmed processes of the unit. In a solution according to the invention, the operations comprise a functionality for implementing the operations of the Group and List Management Server described above.

It will be obvious to a person skilled in the art that as technology advances, the inventive concept can be implemented in various ways. The invention and its embodiments are not limited to the examples described above but may vary within the scope of the claims.

The invention claimed is:

1. A method of managing group information in a communication system capable of providing multipoint group communication between subscribers of a first administrative subsystem and subscribers of a second administrative subsystem, said management of group information including creating, deleting and modifying users and groups for said multipoint group communication, the method comprising:
storing group information of subscribers of a first administrative subsystem in a first server in the first administrative subsystem;
storing group information of subscribers of a second administrative subsystem in a second server in the second administrative subsystem;
receiving, in the first server, a request for a group management action related to management of group information of a particular user;
checking whether the particular user is a user of the first administrative subsystem;
sending from the first server to the second server, in response to the particular user not being said user of the first administrative subsystem, an inquiry for the group information of the particular user;
generating a response to the inquiry in the second server; and
performing the action according to the response to the inquiry.

2. The method according to claim 1, further comprising: generating the response to the inquiry by performing a search in a home subscriber server of the second administrative sub-system.

3. The method according to claim 1, further comprising: generating the response to the inquiry by querying the group information of the particular user from a user of the second administrative subsystem.

4. The method according to claim 1, further comprising: including in the inquiry a request for confirmation of validity of the particular user; and
including in the response at least one of a confirmation and a rejection of the validity of the particular user.

5. The method according to claim 1, further comprising: storing in the group information of the subscribers of the second administrative subsystem a policy rule for a particular group management action;
including in the inquiry at least one parameter related to the particular group management action and a request for confirmation of the particular group management action;
checking a conformance of the at least one parameter to the policy rule; and
including in the response at least one of a confirmation and a rejection of the particular group management action.

6. The method according to claim 1, further comprising: generating, in response to the particular user being said user of the first administrative subsystem, the inquiry;
generating the response to the inquiry; and
performing the action according to the response to the inquiry.

7. A communication system comprising:
a first administrative subsystem;
a second administrative subsystem;
said first and second administrative subsystems providing a multipoint group communication service;
a first server for storing first group and list management information of subscribers of the first administrative subsystem;
a second server for storing second group and list management information of subscribers of the second administrative subsystem;
said first and second group list management information comprising creating, deleting and modifying users and groups for said multipoint group communication; and
an interface for exchanging said first and second group and list management information between the first server and the second server.

8. The communication system as claimed in claim 7, wherein the interface comprises a network-to-network interface.

9. A server of a communication system providing multipoint group communication between subscribers of a first administrative subsystem and a second administrative subsystem, the server comprising:
receiving means for receiving a request for a group management action related to group information of a user, said management of group information including creating, deleting and modifying users and groups for said multipoint group communication; and
processing means for checking whether the user belongs to a first administrative subsystem;
said processing means being arranged to send, in response to the user not belonging to the first administrative subsystem, to a server in the second administrative subsystem, an inquiry for the group information of the user;
said receiving means being arranged to receive a response to the inquiry from the server in the second administrative subsystem; and
said processing means being arranged to perform the action according to the response to the inquiry.

10. The server according to claim 9, wherein said processing means is further arranged to include, in the inquiry, a request for confirmation of validity of the user.

11. The server according to claim 9, wherein said processing means is further arranged to include, in the inquiry, at least one parameter related to the group management action and a request for confirmation of the group management action.

12. A server of a communication system providing group communication between subscribers of a first administrative subsystem and subscriber of a second administrative subsystem, the server comprising:
- storing means for storing group information of subscribers in a second administrative subsystem, said group information comprising definitions for users and groups for said multipoint group communication;
- receiving means for receiving an inquiry for group information of a user from a server in a first administrative subsystem; and
- processing means for generating, in response to receiving the inquiry, a response to the inquiry.

13. The server according to claim 12, wherein said processing means is arranged to perform a search in a home subscriber server for generating the response to the inquiry.

14. The server according to claim 12, wherein said processing means is further arranged to query the group information of the user from the user for generating the response to the inquiry, wherein the user comprises a user of the second administrative subsystem.

15. The server according to claim 12, wherein said processing means is further arranged to receive, in the inquiry, a request for confirmation of validity of the user.

16. A server according to claim 12, wherein
- said storing means is arranged to store a policy rule for a group management action,
- said receiving means is further arranged to receive at least one parameter related to the group management action and a request for confirmation of the group management action,
- said processing means is further arranged to compare a conformance of the at least one parameter to the policy rule, and to include, in the response, at least one of a confirmation and a rejection of the group management action.

17. A computer program on a computer-readable medium, executable in a computer connected to a communication system providing multipoint group communication between subscribers of a first administrative subsystem and a second administrative subsystem, wherein execution of the computer program in the computer causes the computer to carry out the steps of:
- receiving a request for a group management action related to management of group information of a user, said management of group information including creating, deleting and modifying users and groups for said multipoint group communication;
- checking whether the user belongs to a first administrative subsystem;
- generating, in response to the user not belonging to the first administrative subsystem, an inquiry to a server in a second administrative subsystem, wherein the inquiry inquires about group information of the user;
- receiving a response to the inquiry from the server in the second administrative subsystem; and
- performing the action according to the response to the inquiry.

18. A computer program on a computer readable medium, executable in a computer connected to a communication system providing multipoint group communication between subscribers of a first administrative subsystem and a second administrative subsystem, wherein execution of the computer program in the computer causes the computer to carry out the steps of:
- storing group information of subscribers in a second administrative subsystem, said group information comprising definitions for users and groups for said multipoint group communication;
- receiving an inquiry for group information of a user from a server in a first administrative subsystem; and
- generating, in response to receiving the inquiry, a response to the inquiry.

* * * * *